No. 664,240. Patented Dec. 18, 1900.
C. F. W. DOEHRING.
HOSE TRUCK.
(Application filed Aug. 4, 1900.)
(No Model.)
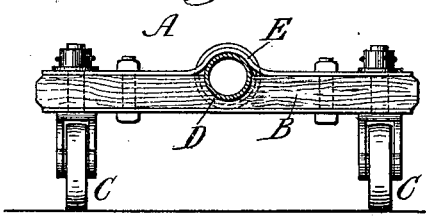
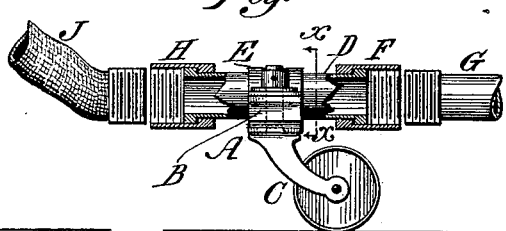
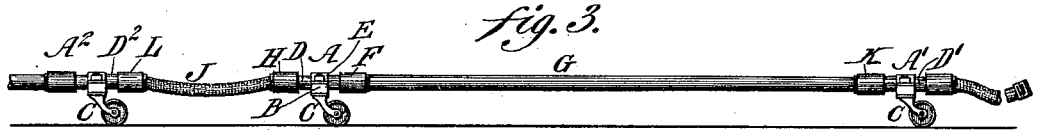
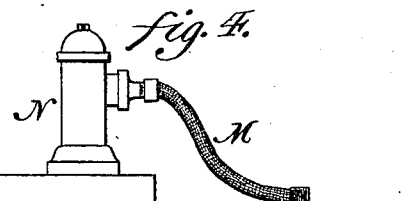
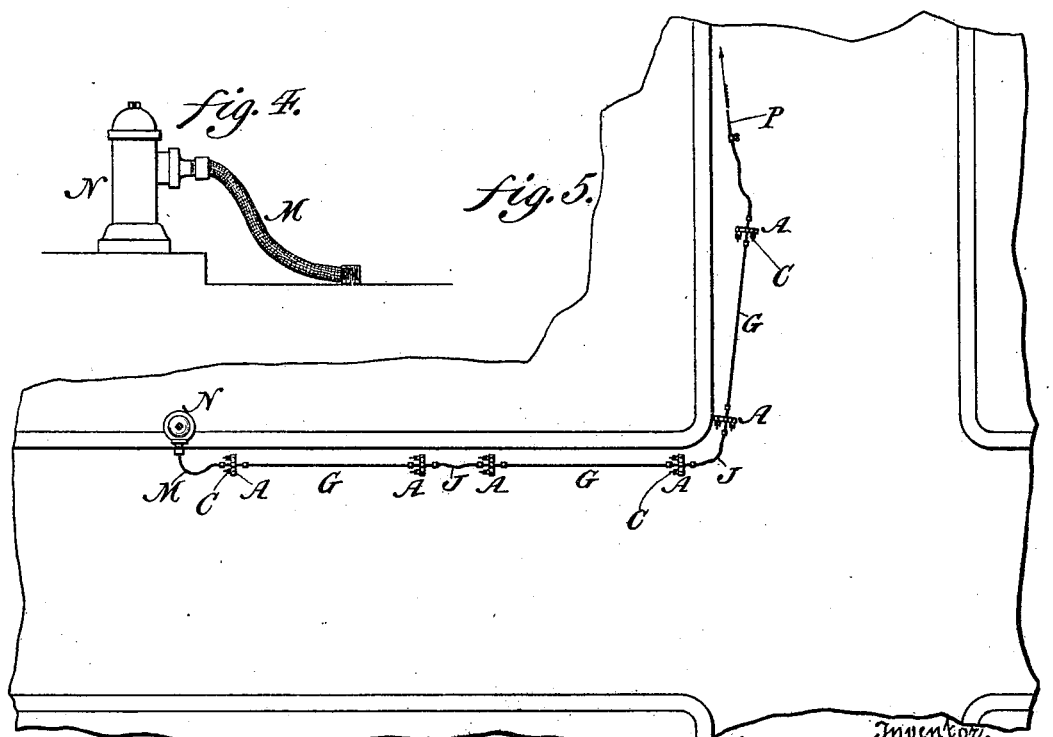

UNITED STATES PATENT OFFICE.

CHARLES F. W. DOEHRING, OF PHILADELPHIA, PENNSYLVANIA, ASSIGNOR OF ONE-HALF TO GEORGE H. DUNSFORD, OF LAFAYETTE, PENNSYLVANIA.

HOSE-TRUCK.

SPECIFICATION forming part of Letters Patent No. 664,240, dated December 18, 1900.

Application filed August 4, 1900. Serial No. 25,859. (No model.)

*To all whom it may concern:*

Be it known that I, CHARLES F. W. DOEHRING, a citizen of the United States, residing in the city and county of Philadelphia, State of Pennsylvania, have invented a new and useful Improvement in Hose-Trucks, which improvement is fully set forth in the following specification and accompanying drawings.

My invention consists of a truck for conveniently running out and supporting hose for garden, lawn, alley, street, sidewalk, and other sprinkling and washing purposes, the same embodying a tube of rigid material mounted on the body of the truck, flexible and rigid pipes at the ends of said tube, couplings on said tube adapted to engage with said pipes, and opposed flanges on said tube and couplings, thus preventing the couplings from becoming detached and lost and providing tight joints for the pipes and tube.

Figure 1 represents an end elevation of a hose-truck embodying my invention. Fig. 2 represents a partial side elevation and partial longitudinal section thereof. Fig. 3 represents a side elevation on a reduced scale. Fig. 4 represents a side elevation of a detached portion. Fig. 5 represents a top or plan view of the device on a reduced scale.

Similar letters of reference indicate corresponding parts in the figures.

Referring to the drawings, A designates a truck consisting of the beam B and the casters C.

D designates a longitudinally-extending tube which is mounted on the beam B and secured thereto by the clip E, the beam and casters thus forming running-gear for said tube. Connected with one end of said tube D by the coupling F is the conveying-pipe G, and connected with the other end thereof by the coupling H is the flexible pipe-section J. The inner ends of said couplings F and H have flanges F' H', respectively, thereon, and the outer ends of the tube D have flanges D' thereon, the flanges of the couplings being adapted to abut against the flanges of said tube, thus preventing the couplings when loose from being detached from said tube, while at the same time causing the screw-collars on the ends of the pipes G and J to be tightly pressed against the ends of the tube D and the respective flanges to abut against each other, so that there will be no leakage of the joints of the pipes G and J and tube D. The pipe G is connected with the tube D' of the adjacent rear truck A' by the coupling K, and the section J is connected with the tube D² of the adjacent fore truck A² by the coupling L, and in this manner the length of hose may be built up and run out in various directions, the sections J yielding and bending for turns, crossings, &c., as will be apparent on inspection of Fig. 5.

One end of the device may be connected by a branch M with a hydrant or other place of supply, as at N, and thus water may be turned on and run through the system of truck-tubes and flexible sections and discharged at the nozzle or branch P.

The pipe G is made of stiff material, such as metal, and forms a rigid connection with the tube D, which is made, preferably, of metal, thus forming a rigid structure with the adjacent trucks, broken at intervals by the flexible pipes J, which readily permit the device to be turned and guided, the several lengths of pipe being coupled together with trucks at intervals.

It is evident that the members of the device may be uncoupled and stored away in compact form and afterward easily assembled and run out to the desired length, the pipes or hose or sections being supported on the trucks as carriages, providing convenient means for manipulating the device as a water-conveyer in drawing, pulling, directing it, and changing its course according to the requirements of the service.

Having thus described my invention, what I claim as new, and desire to secure by Letters Patent, is—

A truck, and a rigid tube mounted thereon, a flexible pipe at one end of said tube, a rigid pipe at the other end thereof, and couplings on the ends of said tube adapted to engage with the ends of said pipes, each end of said tube and of the relative coupling having opposed flanges thereon.

CHARLES F. W. DOEHRING.

Witnesses:
JOHN A. WIEDERSHEIM,
WM. CANER WIEDERSHEIM.